United States Patent

Suzuki et al.

[11] Patent Number: 5,287,028
[45] Date of Patent: Feb. 15, 1994

[54] MINIATURE MOTOR

[75] Inventors: Satoshi Suzuki; Naoshi Kajie, both of Matsudo, Japan

[73] Assignee: Mabuchi Motor Co., Ltd., Chiba, Japan

[21] Appl. No.: 963,427

[22] Filed: Oct. 19, 1992

[30] Foreign Application Priority Data

Oct. 22, 1991 [JP] Japan .................. 3-273661

[51] Int. Cl.$^5$ ............................................. H02K 11/00
[52] U.S. Cl. .................... 310/71; 310/40 MM; 310/42; 310/90; 310/DIG. 6
[58] Field of Search ............. 310/71, 40 MM, 42, 43, 310/DIG. 6, 89, 90

[56] References Cited

U.S. PATENT DOCUMENTS

| | | | |
|---|---|---|---|
| 4,673,834 | 6/1987 | Wrobel | 310/71 |
| 4,800,307 | 1/1989 | Papst | 310/71 |
| 4,806,808 | 2/1989 | Grecksch | 310/71 |
| 5,109,173 | 4/1992 | Someya | 310/40 MM |

FOREIGN PATENT DOCUMENTS 2847301 5/1980 Fed. Rep. of Germany ........ 310/71

5-29257 4/1993 Japan .

Primary Examiner—R. Skudy
Attorney, Agent, or Firm—McGlew & Tuttle

[57] ABSTRACT

A miniature motor comprising a case formed into a bottomed hollow cylindrical shape and having a permanent magnet fixedly fitted to the inner circumferential surface thereof, an end plate engaged with an opening of the case and having input terminals, and a rotor rotatably supported by bearings provided on the case and the end plate; power being fed from the input terminals to the rotor via printed-circuit boards, in which a connector-unit body is fixedly fitted to an outer end of the end plate; the connector unit having such a construction that connector pins formed of a metallic material into a strip shape and having retainer pieces for printed-circuit boards and contactor pieces for input terminals are fixedly fitted to a connector-unit body made of an insulating material and formed into a plate shape, and insertion holes are provided in the vicinity of the retainer pieces so that the printed-circuit boards and input terminals can be electrically connected by inserting the printed-circuit boards into the insertion holes.

7 Claims, 4 Drawing Sheets

5,287,028

MINIATURE MOTOR

BACKGROUND OF THE INVENTION

This invention relates to a miniature motor having such a construction that power is fed via printed-circuit boards on which control equipment is mounted, or printed-circuit boards connected to control circuits.

DESCRIPTION OF THE PRIOR ART

FIG. 1 is a longitudinal-sectional view illustrating the essential part of an example of a miniature motor to which this invention is applied. In FIG. 1, reference numeral 1 refers to a case made of a soft magnetic material, such as mild steel, formed into a bottomed hollow cylindrical shape and having a permanent magnet 2 of an arc-segment shape fixedly fitted to the inner circumferential surface thereof. In the case 1, provided is a rotor 5 comprising an armature 3 facing the permanent magnet 2 and a commutator 4. Numeral 6 refers to an end plate made of an insulating material and engaged with the opening of the case 1.

Numeral 7 indicates a brush arm made of an electrically conductive material provided on the end plate 6, together with an input terminal 8 electrically connected to the brush arm 7, in such a manner as to make sliding contact with the commutator 4. Numerals 9 and 10 indicate bearings fixedly fitted in bearing holders 11 and 12 provided by embossing the bottom part of the case 1 and the end plate 6, respectively, and rotatably supporting a shaft 13.

With the above construction, as current is fed to the armature 3 from the input terminals 8 via the brush arms 7 and the commutator 4, rotating force is imparted to the armature 3 existing in a magnetic field formed by the permanent magnet 2 fixedly fitted to the inner circumferential surface of the case 1, causing the rotor 5 to rotate and drive external equipment (not shown) via the rotating shaft 13.

When mounting printed-circuit boards (hereinafter referred to as PCBs for short) on a miniature motor having the aforementioned construction, the PCBs are soldered directly to the input terminals 8, or lead wires or separated provided connectors are used. Or, connector pins for mounting PCBs are incorporated inside the miniature motor.

Soldering PCBs directly to the input terminals 8 requires a high level of skill in performing complicated soldering operations in an extremely limited space in a miniature motor. This poses a problem in improving productivity in the mass production of miniature motors.

Mounting PCBs on the input terminals 8 via lead wires or connectors involves soldering operations, as noted above, making the entire assembly work complex. In addition, the presence of excess lead wires or connector between the PCBs and the miniature motor requires an additional space for them in the vicinity of the input terminals 8. This makes it difficult to make the entire device, including the miniature motor, compact in size, and thus the increasing need in recent years for downsizing this type of device cannot be satisfied. With the aforementioned mounting means, fixing and other post-treatment of lead wires or connectors are needed after PCBs have been mounted. This leads to increased manufacturing cost.

Furthermore, when connector pins are incorporated inside miniature motors, the miniature motors becomes a special type incorporating the connector pins, requiring an increase in the number of production items. This is not suitable for mass production requiring component standardization, and leads to increased cost. Since conventional PCB-mounting connector pins have such a construction that connector pins are formed by bending a spring material and caused to bite into the PCBs, it is difficult to remove the PCBs once mounted, and replace it after removed. This construction cannot cope with the need for detachability of PCBs in miniature motors.

SUMMARY OF THE INVENTION

It is the first object of this invention to provide a miniature motor having flexibility and PCB-detachability.

It is the second object of this invention to provide a miniature motor having such a construction as to allow cost reduction.

BRIEF DESCRIPTION OF THE DRAWINGS

FIG. 9 showing the exploded state, and FIG. 10 showing the assembled state.

DETAILED DESCRIPTION OF THE EMBODIMENTS

Figure 1:
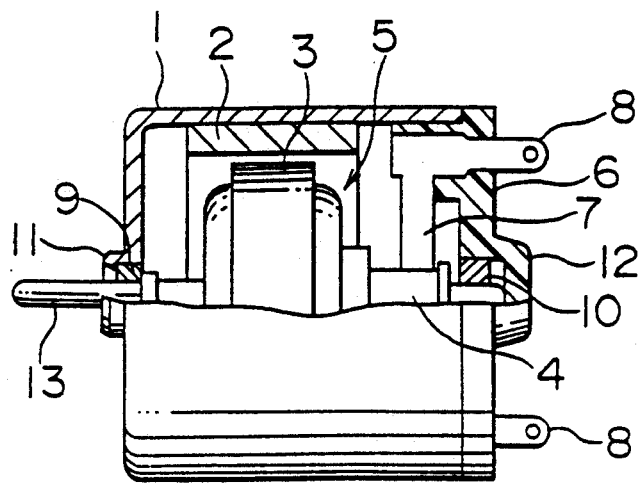
FIG. 1 is a longitudinal-sectional view illustrating the essential part of an example of a miniature motor to which this invention is applied (Prior Art).
Figure 2:
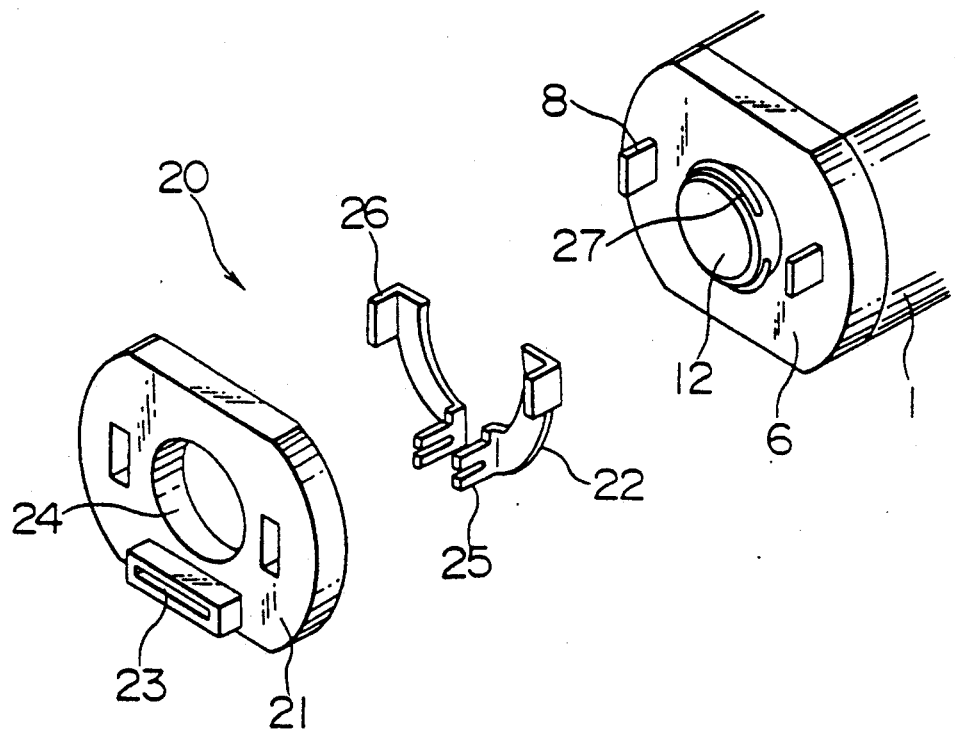
FIG. 2 is an exploded perspective view illustrating the essential part of an embodiment of this invention.

FIG. 2 is an exploded perspective view illustrating an embodiment of this invention. Like parts are indicated by like numerals shown in FIG. 1. In FIG. 2, numeral 20 denotes a connector unit consisting of a connector-unit body 21 and connector pins 22. The connector-unit body 21 is made of an insulating material and is formed into substantially a plate shape, with the outer contour thereof being formed into almost the same shape as that of the end plate 6. Numeral 23 denotes a PCB insertion hole, 24 a bearing-holder hole for accommodating a bearing holder 12 on the end plate 6. The bearing-holder hole 24 may be a bottomed recess so long as the hole 24 does not act to interfere with the bearing holder 12. Next, the connector pins 22 are made of an electrically conductive material and formed into a strip shape of an almost arc-segment shape, and fixedly fitted to the connector-unit body 21, forming a pair. At both ends of each connector pin 22 provided in a protruded state are a retainer piece 25 and a contactor piece 26, by bending the ends thereof by pressing means, for example. Numeral 27 is a projection provided integrally on the outer periphery of the bearing holder 12.

Figure 3:
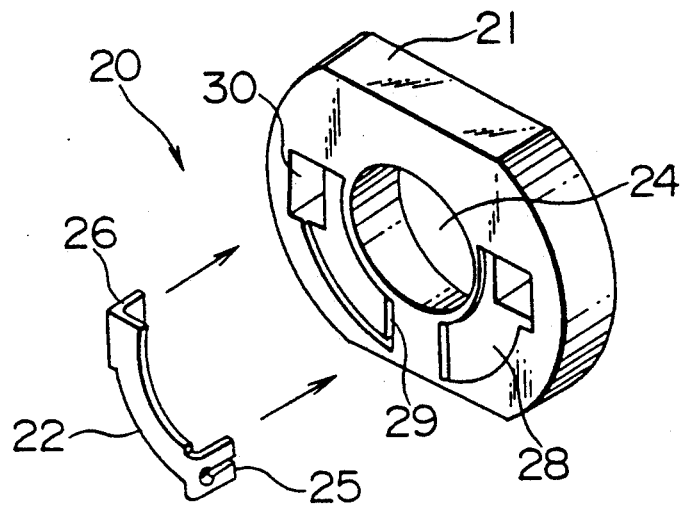
FIG. 3 is an exploded perspective view illustrating the essential part of a connector-unit body and a connector pin shown in FIG. 2.
Figure 4:
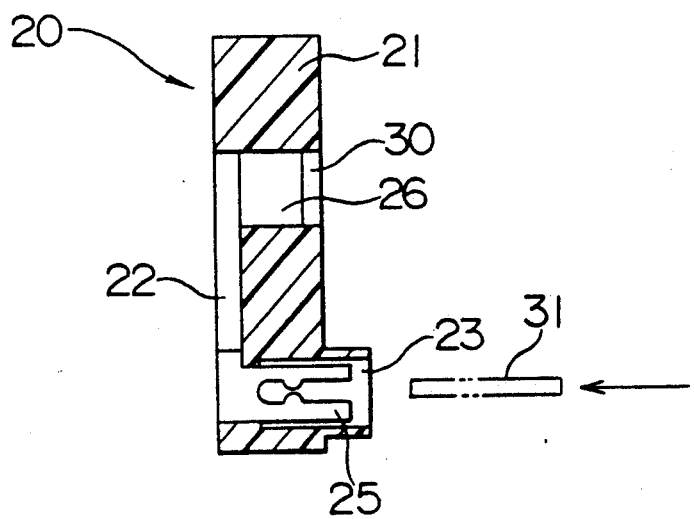
FIG. 4 is a cross-sectional view illustrating the essential part of the connector unit shown in FIGS. 2 and 3.

FIG. 3 is an exploded perspective view illustrating the rear side of the connector-unit body 21 and the connector pins 22 shown in FIG. 2. Like parts are indicated by like numerals in FIG. 2. Numeral 28 refers to recesses formed on the rear surface of the connector-unit body 21 to a depth corresponding to the thickness of the connector pins 22, and insertion holes 29 and 30 are provided at the upper and lower ends of the recesses 28. The connector unit 20 is assembled by fitting the connector pins 22 to the recesses 28 and inserting the retainer pieces 25 and the contactor pieces 26 into the insertion holes 29 and 30. FIG. 4 is a cross-sectional view illustrating the assembled state of the connector unit 20 shown in FIGS. 2 and 3. The connector unit thus assembled is fixedly fitted to the end plate 6 shown in FIG. 2. In this state, as a PCB 31 is inserted into the PCB insertion hole 23 in the direction shown by an arrow in the figure the PCB 31 can be held in position at a predetermined pressure by the elastic deformation of the retainer piece 25. The PCB can be extracted from the PCB insertion hole by exerting a moderate degree of pulling force.

Figure 5:
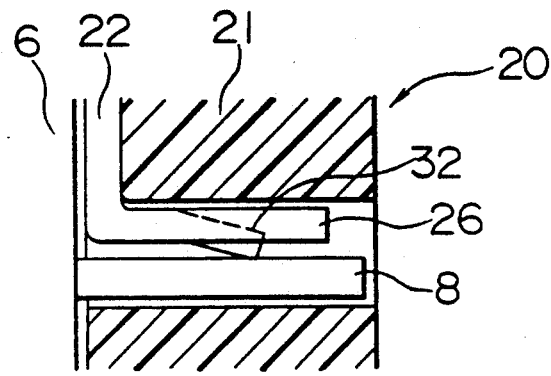
FIG. 5 is a cross-sectional view illustrating the state where the connector unit is fixedly fitted to the end plate.
Figure 6:
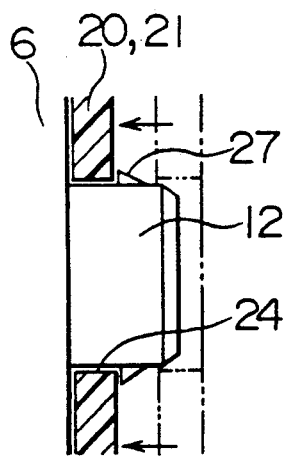
FIG. 6 is a cross-sectional view illustrating the state where the connector unit is fixedly fitted to the end plate.

FIGS. 5 and 6 are cross-sectional views illustrating the state where the connector unit 20 is fixedly fitted to the end plate 6. Like parts are indicated by like numerals shown in FIGS. 1 through 4. In FIG. 5, numeral 32 refers to a lanced and raised part formed in the middle of the contactor piece 26 of the connector pin 22 by lancing and raising part of the contactor piece 26 toward the input-terminal 8 side. By mounting the connector unit 20 on the end plate 6, the lanced and raised part 32 makes contact with the input terminal 8 by a predetermined elastic force, thus maintaining electrical connection.

In FIG. 6, by mounting the connector unit 20 on the end plate 6, the bearing-holder hole 24 on the connector-unit body 21 engages with the projection 27 provided on the outer periphery of the bearing holder 12, and the connector-unit body 21 reaches the end plate 6 beyond the projection 27. Thus, the connector unit 20 is fixedly fitted to the end plate 6 by a single operation.

Figure 7:
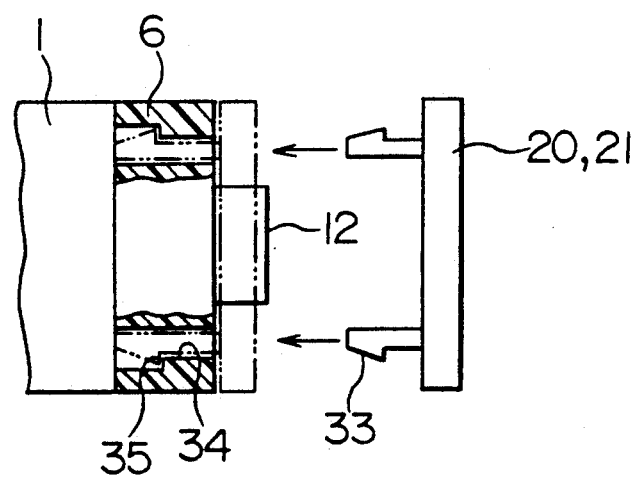
FIG. 7 is a partially cross-sectional diagram of assistance in explaining another example in which the connector unit is fixedly fitted to the end plate.

FIG. 7 is a partially cross-sectional diagram of assistance in explaining illustrating another example in which the connector unit 20 is fixedly fitted to the end plate 6. In FIG. 7, numeral 33 is engaging pieces formed integrally with the connector-unit body 21, with the tips thereof formed into an arrowhead shape protruding from the connector-unit body 21. Numeral 34 refers to insertion holes provided at locations corresponding to the engaging pieces 33 and having locking parts 35. By forming in this manner, as the connector unit 20 is mounted on the end plate 6 in the direction shown by an arrow, the engaging pieces 33 is inserted into the insertion holes 34, and the tips of the engaging pieces 33 are locked by the locking parts 35. Thus, the connector unit 20 is securely fitted to the end plate 6.

Figure 8:
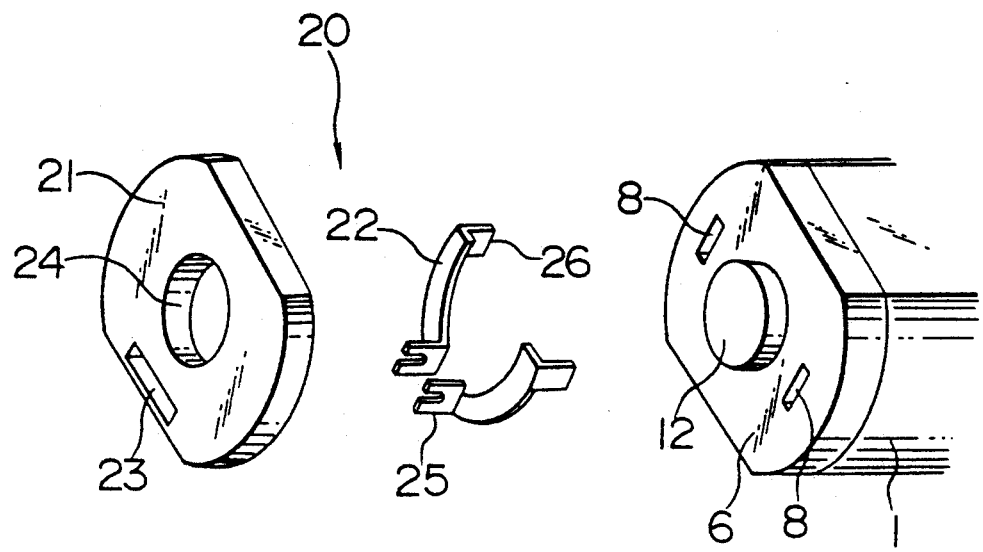
FIG. 8 is an exploded perspective view illustrating another embodiment of this invention.
Figure 9:
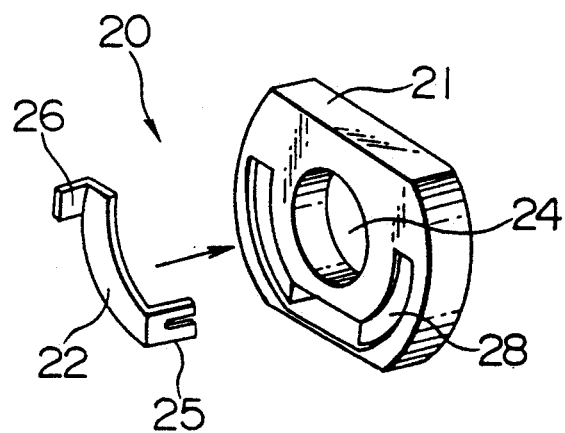
FIGS. 9 and 10 are perspective views illustrating the connector-unit body and the connector pins.
Figure 10:
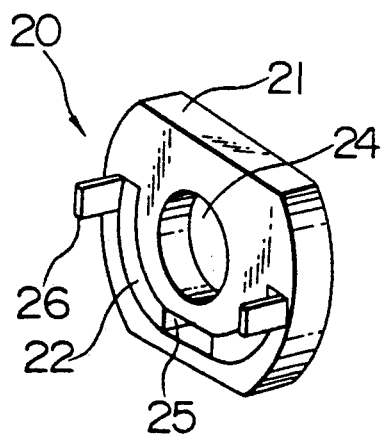

FIG. 8 is an exploded perspective view illustrating another example in which the connector unit 20 is fixedly fitted to the end plate 6. Like parts are indicated by like numerals shown in FIGS. 2 and 3. In FIG. 8, the input terminals 8 are so-called female-type terminals existing on the end plate 6, unlike the male-type terminals shown in the aforementioned embodiments. The only difference is therefore that the contactor pieces 26 are bent toward the direction in which the contactor pieces 26 are inserted into the end plate 6. FIGS. 9 and 10 are perspective views illustrating the connector-unit body 21 and the connector pins 22 shown in FIG. 8. FIG. 9 shows the exploded state, and FIG. 10 the assembled state. That is, the connector unit 20 can be formed by installing the connector pins 22 are inserted into the connector-unit body 21 in the direction shown by an arrow. At the same time, the contactor pieces 26 are also inserted to the input terminals 8 shown in FIG. 8 to maintain electrical connection. The construction other than the above-mentioned points is the same as that of the aforementioned embodiments, and the operation of this embodiment is also the same as that of the aforementioned other embodiments.

This invention having the construction and operation described above has the following effects.

(1) PCBs can be mounted on a miniature motor merely by fitting the connector unit to the end plate of the miniature motor. This leads to a substantial improvement in working efficiency.

(2) The miniature motor of this invention has great versatility, and can satisfy both terminal specifications and PCB specifications, depending on customers' needs. This lends itself to standardization of miniature motors and helps reduce manufacturing cost.

(3) Since the connector unit is compact in size, no post-treatment is needed even after it is incorporated in a miniature motor. This meets the market's needs for downsizing the motors.

(4) The fact that PCBs are detachable helps improve maintain-ability on the users' side.

What is claimed is:

1. A miniature motor comprising a case formed into a bottomed hollow cylindrical shape and having a permanent magnet fixedly fitted to an inner circumferential surface thereof, an end plate engaged with an open end of said case and having input terminals, and a rotor rotatably supported by bearings provided on said case and said end plate; power being fed to said rotor from said input terminals via a printed-circuit board, connector pins made of an electrically conductive material, each of said connector pins being formed into a strip shape and having an end with a retainer piece for said printed-circuit board and an end with a contactor piece for said input terminals, said connector pins being fixedly fitted to a connector unit formed by fixedly fitting said connector pins to a connector-unit body made of an insulating material and formed into a substantially plate shape; insertion holes being provided in said connector-unit body in the vicinity of said retainer pieces, and electrical connections between said printed-circuit board and said input terminals being achieved by inserting said printed-circuit board into said insertion holes.

2. A miniature motor as set forth in claim 1 wherein a middle part of each of said connector pins is formed into an arc-segment shape, and said retainer piece and said contactor piece being formed by a bending operation.

3. A miniature motor as set forth in claim 1 wherein said retainer piece and said contactor piece are provided in such a manner as to protrude in a connection direction, and are inserted into said connector-unit body.

4. A miniature motor as set forth in claim 1 wherein said retainer piece and said contactor piece are provided in such a manner as to protrude in an opposite direction with each other; said retainer piece being inserted into said connector-unit body and said contactor piece being inserted into said end plate.

5. A miniature motor as set forth in claim 1 wherein a bearing holder is provided by embossing the outer end face of said end plate, and a projection is provided on an outer periphery of said bearing holder; said connector-unit body being fixedly fitted to said end plate by engaging said projection with a bearing-holder hole.

6. A miniature motor as set forth in claim 1 further comprising engaging pieces each of which is provided integrally with an inner end face of said connector-unit body; said engaging pieces, each of said pieces being inserted in one of insertion holes provided on said end plate to fixedly fit said connector-unit body to said end plate.

7. A miniature motor as set forth in claim 1 wherein a bearing holder is provided by embossing an outer end face of said end plate, a projection is provided on an outer periphery of said bearing holder, said connector-unit body being fixedly fitted to an inner circumferential surface of a recess provided on said connector-unit body.

* * * * *